J. O. McKEAN.
HEADLIGHT FOR VEHICLES.
APPLICATION FILED SEPT. 15, 1909.
1,013,300.
Patented Jan. 2, 1912.
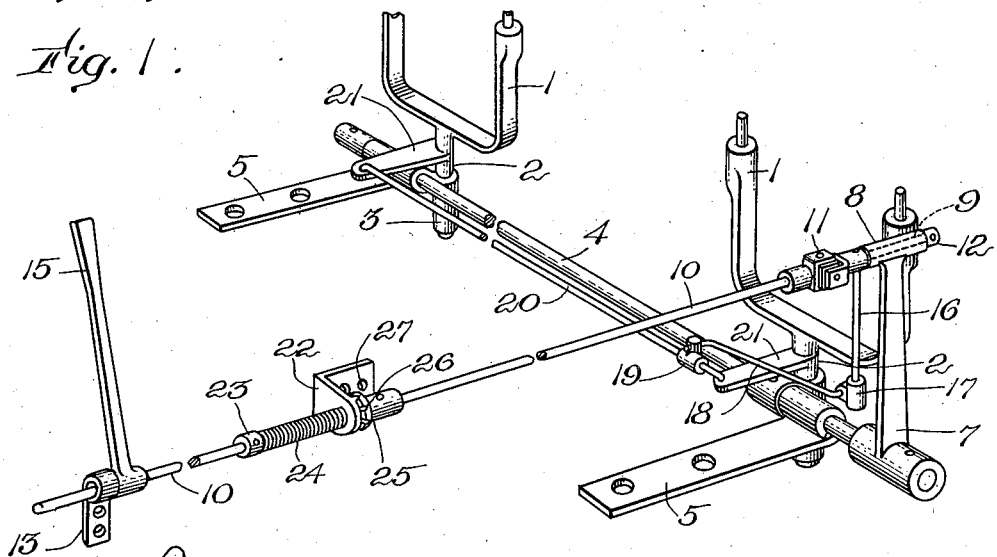
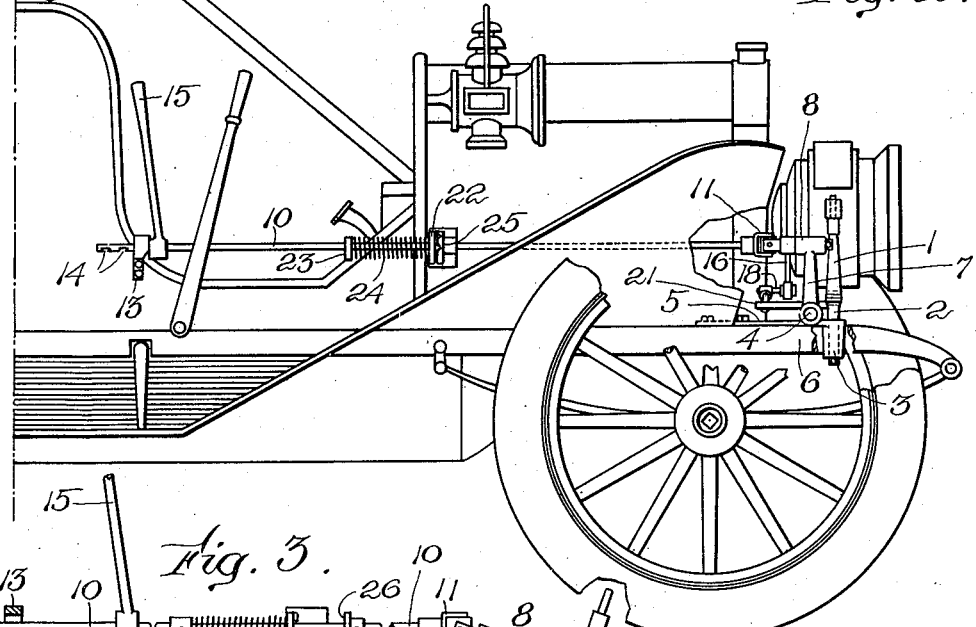
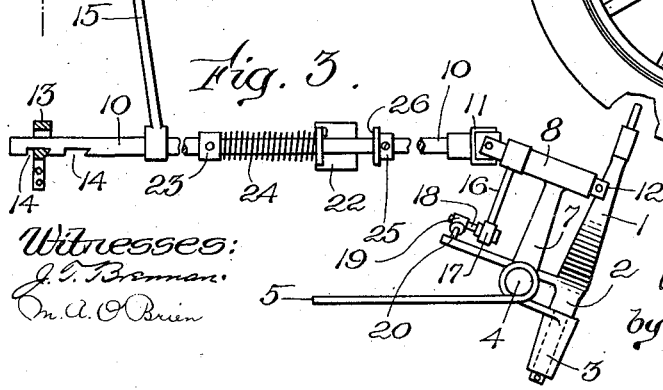

UNITED STATES PATENT OFFICE.

JOHN O. McKEAN, OF WESTFIELD, MASSACHUSETTS.

HEADLIGHT FOR VEHICLES.

1,013,300.  Specification of Letters Patent.  Patented Jan. 2, 1912.

Application filed September 15, 1909. Serial No. 517,813.

*To all whom it may concern:*

Be it known that I, JOHN O. McKEAN, citizen of the United States, residing at Westfield, in the county of Hampden and State of Massachusetts, have invented new and useful Improvements in Headlights for Vehicles, of which the following is a specification.

My invention relates to headlight apparatus for vehicles, particularly automobiles and other self propelled vehicles.

Automobiles are usually equipped with headlights comprising two powerful search lights, one at each side of the front of the machine, fastened immovably to the body or frame thereof. So long as a vehicle so equipped traveled a straight path the search lights would be directed onto said path in advance of the vehicle but in traversing curves the lights would be directed toward one side or the other of the road and away from the curved path taken by the vehicle, thus rendering the lights practically useless until a straight course was again assumed. These automobile searchlights are usually so brilliant as to be confusing and blinding to a person in the path of the vehicle, so much so, that in towns and cities it is customary to establish regulations making it necessary for automobile drivers to extinguish their searchlights in passing through.

One of the objects of my invention is to provide a headlight apparatus for vehicles whereof the lamp, or lamps, are or may be kept pointed in the direction of travel of the vehicle.

Another object of my invention is to provide a headlight apparatus whereof the lamp, or lamps, may be thrown into and out of use at will.

To these ends my invention consists of a headlight apparatus comprising a lamp; means to support said lamp with provision for turning on a vertical axis, and means for turning said lamp sidewise on said axis.

My invention further consists of a headlight apparatus comprising a lamp supported with provision for tilting movement on a horizontal axis and means for tilting said lamp on said axis to throw the lamp into and out of use. In the best form of my improved apparatus both of these features are combined and a single control member is provided connected with the lamp or lamps through which the operator swings the lamp sidewise or tilts it vertically at will, means being preferably provided for holding the lamp in adjusted position.

Other features of my invention are hereinafter pointed out.

In the accompanying drawings:—Figure 1 is a perspective view of my improved headlight apparatus; Fig. 2 is a side elevation of the forward part of an automobile equipped with the apparatus shown in Fig. 1; and Fig. 3 is a side elevation of the apparatus shown in Fig. 1 showing how the lamp support is tilted to throw the lamps out of use.

My improved headlight apparatus comprises two lamp-holding yokes 1—1 having depending studs 2 swiveled at their lower ends in brackets 3 fixed to a rock shaft 4. The rock shaft 4 is journaled in brackets 5 fastened to the side bars 6 of the vehicle frame, and said shaft has fixed to it at one end thereof, an arm 7 made at its upper end with a socket 8. In this socket 8 is mounted a short shaft or spindle 9 connected at one end to a rod 10 by a universal joint 11. The forward end of the short shaft 9 has fixed to it a collar 12 which together with the universal joint 11 prevents endwise movement of the shaft in the socket 8. The rear end of the rod 10 rests in a slotted bracket 13 fixed to the side of the vehicle body and is provided on its under side with notches 14. Also this end of the rod 10 has fixed to it a handle or control member 15 which extends upwardly so that it may be grasped and manipulated by the operator in the seat of the vehicle. Projecting rigidly downward from the shaft or spindle 9 is an arm 16 carrying at its lower end a block 17 to which is pivotally connected one end of a link 18. The other end of link 18 is pivotally connected to a block 19 fastened to a rod 20 which connects two arms 21 projecting rigidly from the yokes 1. Fixed to the body of the vehicle is a bracket 22 through which the rod 10 loosely extends and between this bracket and a collar 23 fixed to the rod 10 is a spring 24 which acts to force the rod 10 endwise toward the rear so as to hold a collar 25 fixed to said rod against one side of the bracket 22. The collar 25 is made with notches 26 coöperating with tongues 27 on the face of the bracket 22 to yieldingly hold the rod 10 against rotation.

When the vehicle is traveling over a curved path the operator, by means of the control member 15, rotates the rod 10 thereby swinging the arm 16 laterally and this movement of arm 16 acts through links 18 and 20 to turn the lamp-holding yokes 1 on their vertical axes so as to point the lamps in the direction of the travel of the vehicle, the engagement of the collar 25 with the bracket 22 serving to yieldingly hold the lamp yokes 1 in adjusted position. When it is desired to throw the lamps out of use, the operator by means of the control member 15 shoves the rod 10 forward, and this movement of said rod acts through the arm 7 and rock shaft 4 to tilt the lamp-holding yokes 1 forward on the horizontal axis of shaft 4 so that the lamps are pointed downward toward the ground. This forward movement of the rod 10 brings one of the notches 14 into engagement with the bracket 13 thereby locking the rod 10 in its forward position. To restore the lamps the operator lifts the rear end of the rod 10 upwardly far enough to disengage the notch 14 from the bracket 13, whereupon the spring 24, assisted by the operator, shifts the rod 10 rearwardly, thereby restoring the lamps to their operative positions.

Fig. 3 shows the positions of the parts when the lamp yokes 1 are tilted forward to throw the lamps out of use.

The apparatus above described is simple in construction, can be applied to any make or style of automobile without material modification, and is easily and quickly manipulated to control the lamps.

I claim:

1. A headlight apparatus for automobiles and the like comprising a lamp; means for supporting said lamp with provision for swinging movement vertically and horizontally; a single control member connected with said lamp for swinging the latter vertically and horizontally, and means for automatically holding the lamp against swinging movement in any direction while the apparatus is out of the control of the operator.

2. A headlight apparatus for vehicles comprising a bracket; a bracket support with which the bracket is connected so as to swing vertically on a horizontal pivot; a lamp pivotally mounted on the bracket so as to swing sidewise; a rotatable and endwise movable control rod, and means connecting the control rod with the bracket and lamp, respectively, through which said rod acts to swing the lamp sidewise and vertically.

3. A headlight apparatus for vehicles comprising a bracket; a bracket support with which the bracket is connected so as to swing vertically on a horizontal pivot; a lamp pivotally mounted on the bracket so as to swing sidewise; a rotatable and endwise movable control rod; means connecting the control rod with the bracket and lamp, respectively, through which said rod acts to swing the lamp sidewise and vertically, and automatically acting means to catch and hold the rod in its different adjusted positions both when rotated and when moved endwise.

4. The combination with an automobile of a transverse shaft journaled upon the front end of the vehicle; a bracket fixed to said shaft; a lamp pivotally mounted on said bracket so as to swing sidewise on a perpendicular pivot; a rotatable and endwise movable control rod mounted on the vehicle and extending rearward from the front end thereof; means connecting the forward end of the rod with the shaft through which endwise movement of said rod rocks the shaft, and means connecting the forward end of the rod with the lamp through which rotation of the rod acts to swing the lamp sidewise on its perpendicular pivot.

5. The combination with an automobile of a transverse shaft journaled upon the front end of the vehicle; a bracket fixed to the shaft; a lamp pivotally mounted on said bracket so as to swing sidewise on a perpendicular pivot; a rotatable and endwise movable control rod mounted on the vehicle and extending rearward from the front end thereof; means connecting the forward end of the rod with the shaft through which endwise movement of said rod rocks the shaft; means connecting the forward end of the rod with the lamp through which rotation of the rod acts to swing the lamp sidewise on its perpendicular pivot, and means on the vehicle coöperating with the control rod to lock the latter in its different adjusted positions.

6. The combination with an automobile of a transverse shaft journaled upon the front end of the vehicle; a bracket fixed to the shaft; a lamp pivotally mounted on said bracket so as to swing sidewise on a perpendicular pivot; a rotatable and endwise movable control rod mounted on the vehicle and extending rearward from the front end thereof; an arm fixed to the shaft; a universal joint connecting the control rod with said arm; a second arm connected and movable with the control rod; a link connecting the second arm with the lamp; a bracket fixed to the vehicle adjacent the control rod; a collar fixed to the control rod and coöperating with the bracket and a spring acting on the control rod to normally hold the collar in engagement with the bracket on the vehicle so as to yieldingly prevent rotation of the control rod.

7. The combination with an automobile of a transverse shaft journaled upon the front end of the vehicle; a bracket fixed to the shaft; a lamp pivotally mounted on said bracket so as to swing sidewise on a perpendicular pivot; a rotatable and endwise movable control rod mounted on the vehicle and extending rearward from the front end thereof; a handle fixed to the control rod at a point adjacent the seat of the driver of the vehicle so as to be used by him to rotate the control rod or move it endwise; an arm fixed to the shaft; a socket on said arm; a spindle journaled in said socket; a universal joint connecting the forward end of the control rod with the spindle; an arm projecting from the spindle and a link connecting said arm with the lamp.

8. The combination with an automobile of a transverse shaft journaled upon the front end of the vehicle; a bracket fixed to the shaft; a lamp pivotally mounted on said bracket so as to swing sidewise on a perpendicular pivot; a rotatable and endwise movable control rod mounted on the vehicle and extending rearward from the front end thereof; a handle fixed to the control rod at a point adjacent the seat of the driver of the vehicle so as to be used by him to rotate the control rod or move it endwise; a bracket projecting the vehicle; a collar fixed to the control rod and coöperating with said bracket; a spring acting on the control rod so as to normally hold the collar in engagement with said bracket to yieldingly prevent rotation of the rod; means connecting the forward end of the rod with the shaft through which endwise movement of said rod rocks the shaft and means connecting the forward end of the rod with the lamp through which rotation of the rod acts to swing the lamp sidewise on its perpendicular pivot.

Signed by me at Westfield, Massachusetts, this thirty-first day of August, 1909.

JOHN O. McKEAN.

Witnesses:
ALICE C. BREEN,
E. T. FOWLER.